United States Patent
Hsiao

(10) Patent No.: US 9,545,174 B2
(45) Date of Patent: Jan. 17, 2017

(54) DIRECTLY FALLING POWDER TYPE COFFEE GRINDING MACHINE

(71) Applicant: Chung-Min Hsiao, Tainan (TW)

(72) Inventor: Chung-Min Hsiao, Tainan (TW)

(*) Notice: Subject to any disclaimer, the term of this patent is extended or adjusted under 35 U.S.C. 154(b) by 304 days.

(21) Appl. No.: 14/463,713

(22) Filed: Aug. 20, 2014

(65) Prior Publication Data

US 2015/0102149 A1 Apr. 16, 2015

(30) Foreign Application Priority Data

Oct. 11, 2013 (TW) .............................. 102218967 U

(51) Int. Cl.
*A47J 42/46* (2006.01)
*A47J 42/06* (2006.01)
*A47J 42/08* (2006.01)

(52) U.S. Cl.
CPC .................. *A47J 42/46* (2013.01); *A47J 42/06* (2013.01); *A47J 42/08* (2013.01)

(58) Field of Classification Search
CPC ............. A47J 42/46; A47J 42/08; A47J 42/06
USPC .......................................................... 241/100
See application file for complete search history.

(56) References Cited

U.S. PATENT DOCUMENTS

2009/0127363 A1* 5/2009 Malykke ................. A47J 42/40
241/248

* cited by examiner

*Primary Examiner* — Mark Rosenbaum
(74) *Attorney, Agent, or Firm* — Alan D. Kamrath; Kamrath IP Lawfirm, P.A.

(57) ABSTRACT

A coffee grinding machine includes a base, a motor and a grinding device. The motor is mounted in the base. The base has a top face provided with a platform for mounting the grinding device. The grinding device includes an outer cutter and an inner cutter. A bearing is mounted on the outer cutter to drive the outer cutter so that the outer cutter is rotated above the inner cutter to grind the falling coffee beans into coffee powders. Thus, the coffee powders fall down vertically and will not remain in the grinding device.

2 Claims, 5 Drawing Sheets

DIRECTLY FALLING POWDER TYPE COFFEE GRINDING MACHINE

BACKGROUND OF THE INVENTION

1. Field of the Invention

The present invention relates to a coffee grinding machine and, more particularly, to a directly falling powder type coffee grinding machine.

2. Description of the Related Art

A conventional coffee grinding machine 1 in accordance with the prior art shown in FIG. 1 comprises an upper cutter 11 and a lower cutter 12 with a clearance being defined between the upper cutter 11 and the lower cutter 12 for controlling the size of coffee powder. The upper cutter 11 and the lower cutter 12 are mounted on a cylindrical rotation shaft 13. When the coffee grinding machine 1 is energized, the rotation shaft 13 is rotated to drive and rotate the lower cutter 12 so that the blade 121 of the lower cutter 12 is rotated in the upper cutter 11 at a high speed. When coffee beans (not shown) pass through the upper cutter 11 and the lower cutter 12, the coffee beans are cut between the blade 111 of the upper cutter 11 and the blade 121 of the lower cutter 12 to produce coffee powders which are dropped into a channel 14 and then delivered outward from an outlet 141 of the channel 14. However, the coffee powders are fine powders which easily remain in the channel 14, so that when fresh coffee beans are ground at the next grinding step, the fresh coffee powders are easily mixed with the previous coffee powders remaining in the channel 14, thereby decreasing the quality of the coffee. In addition, the upper cutter 11 and the lower cutter 12 are not cleaned easily and conveniently, thereby wasting the user's energy and time. Further, the conventional coffee grinding machine 1 has many parts and is not assembled easily, thereby causing inconvenience to the user in cleaning the upper cutter 11 and the lower cutter 12. Further, when different coffee beans are used, the new coffee beans are partially poured into the conventional coffee grinding machine 1 to push out the previous coffee powders remaining in the channel 14, thereby wasting the coffee beans.

BRIEF SUMMARY OF THE INVENTION

In accordance with the present invention, there is provided a coffee grinding machine comprising a base, a motor and a grinding device. The motor is mounted in the base. The base has a top face provided with a platform. The platform is provided with a positioning hole for mounting the grinding device. The motor is connected with a belt wheel by a belt, a gear or a chain. The grinding device includes an outer cutter and an inner cutter. Blades of the outer cutter and the inner cutter are cooperate with each other. A bearing is mounted on and located above the outer cutter. The bearing is connected with the belt wheel. The belt wheel is rotated to drive the bearing so that the outer cutter is rotated at a high speed. The inner cutter has a conic shape, and is mounted on a support seat. The support seat has an interior provided with a plurality of through holes. The inner cutter is mounted in the outer cutter. The outer cutter is rotated about the inner cutter which functions as a center.

Preferably, a clearance is defined between the outer cutter and the inner cutter and is adjustable to control a size of coffee powder.

According to the primary advantage of the present invention, the outer cutter is rotated to grind the coffee beans so that the coffee powders fall down vertically and will not be blocked on the outer cutter or the inner cutter to prevent the coffee powders from remaining in the outer cutter or the inner cutter, thereby facilitating the user clearing the grinding device.

According to another advantage of the present invention, the outer cutter is rotated to grind the coffee beans so that the coffee powders fall down completely and will not remain in the grinding device so that the coffee powders will not affect the next grinding procedures, thereby enhancing the coffee quality.

According to a further advantage of the present invention, when the coffee beans are replaced, it is unnecessary to use fresh coffee beans to push previous coffee beans produced in the last grinding process, thereby saving the coffee beans.

According to a further advantage of the present invention, the coffee powders will not remain in the grinding device so that the user needs not to detach the grinding device for clearing the coffee powders.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
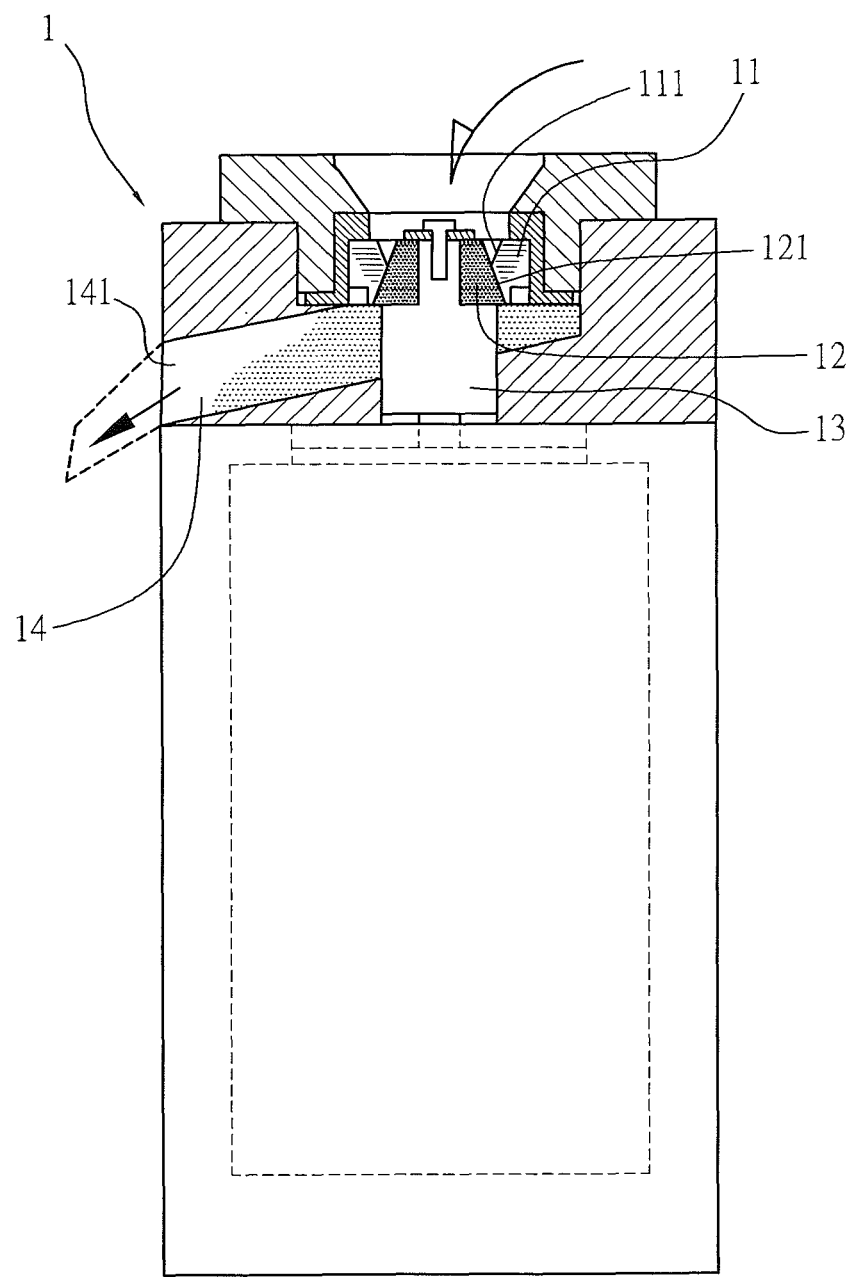
FIG. 1 is a side cross-sectional view of a conventional coffee grinding machine in accordance with the prior art.
Figure 2:
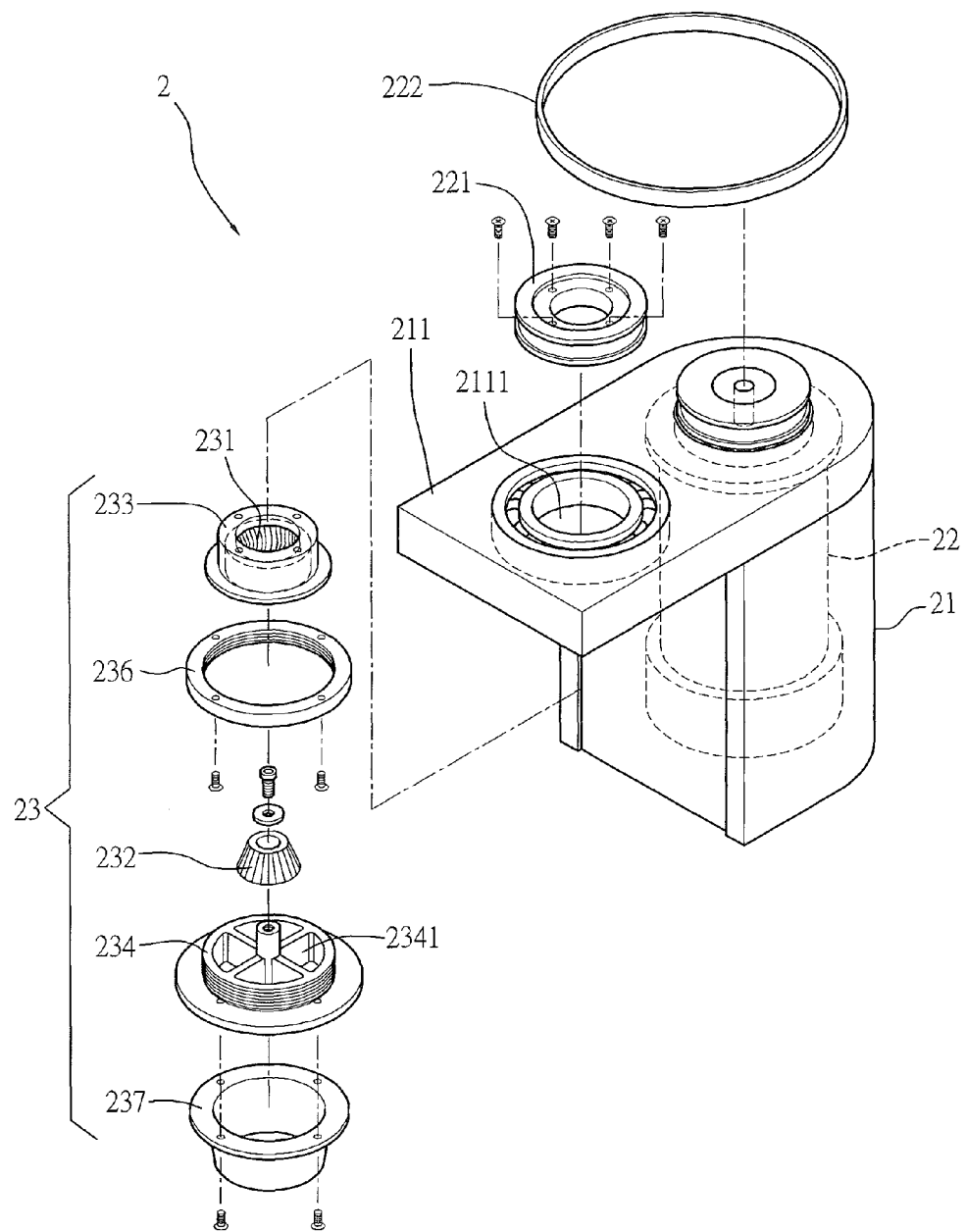
FIG. 2 is an exploded perspective view of a coffee grinding machine in accordance with the preferred embodiment of the present invention.

Referring to the drawings and initially to FIG. 2, a coffee grinding machine 2 in accordance with the preferred embodiment of the present invention comprises a base 21, a motor 22 and a grinding device 23. The motor 22 is mounted in the base 21. The base 21 has a top face provided with a platform 211. The platform 211 is provided with a positioning hole 2111 for mounting the grinding device 23. The grinding device 23 includes an outer cutter 231 and an inner cutter 232. The inner cutter 232 is mounted in the outer cutter 231. Blades of the outer cutter 231 and the inner cutter 232 cooperate with each other, with a clearance between the blades of the outer cutter 231 and the inner cutter 232 being adjustable to control the size of the coffee powder. A bearing 233 is mounted on and located above the outer cutter 231. The bearing 233 is connected with a belt wheel 221 which is connected with a belt 222, a gear or a chain. The belt 222 drives the belt wheel 221 which drives the bearing 233. Thus, the belt wheel 221 drives and rotates the balls in the bearing 233 so that the outer cutter 231 is rotated at a high speed. The inner cutter 232 has a conic shape, and is mounted on a support seat 234 by a screw 235. The support seat 234 has an interior provided with a plurality of through holes 2341. A passage 237 is mounted on and located under the support seat 234. Thus, the coffee powder directly passes through the through holes 2341 into the passage 237.

Figure 3:
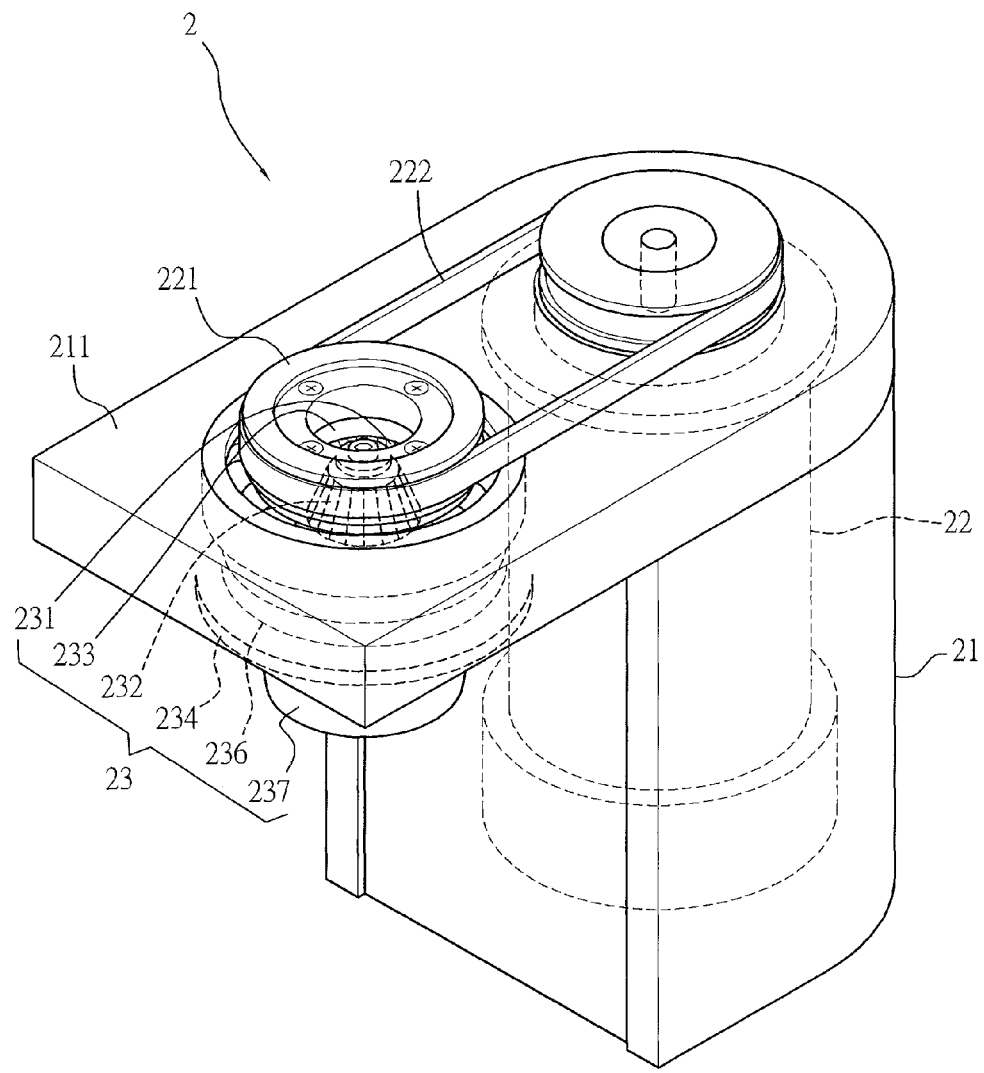
FIG. 3 is a perspective view of the coffee grinding machine in accordance with the preferred embodiment of the present invention.

In assembly, referring to FIGS. 2 and 3, the outer cutter 231 is placed into the bearing 233, and the bearing 233 is connected with the belt wheel 221 so that the bearing 233 is driven by the belt wheel 221. The bottom of the bearing 233 is connected with the support seat 234. The support seat 234 is fixed on the positioning hole 2111 of the platform 211 by a threaded ring 236. The inner cutter 232 is mounted on the support seat 234 and is received in the outer cutter 231. The clearance is defined between the outer cutter 231 and the inner cutter 232 to adjust the size of the coffee powder. The passage 237 is mounted on and located under the support seat 234 so that the coffee powder is gathered and falls downward vertically.

Figure 4:
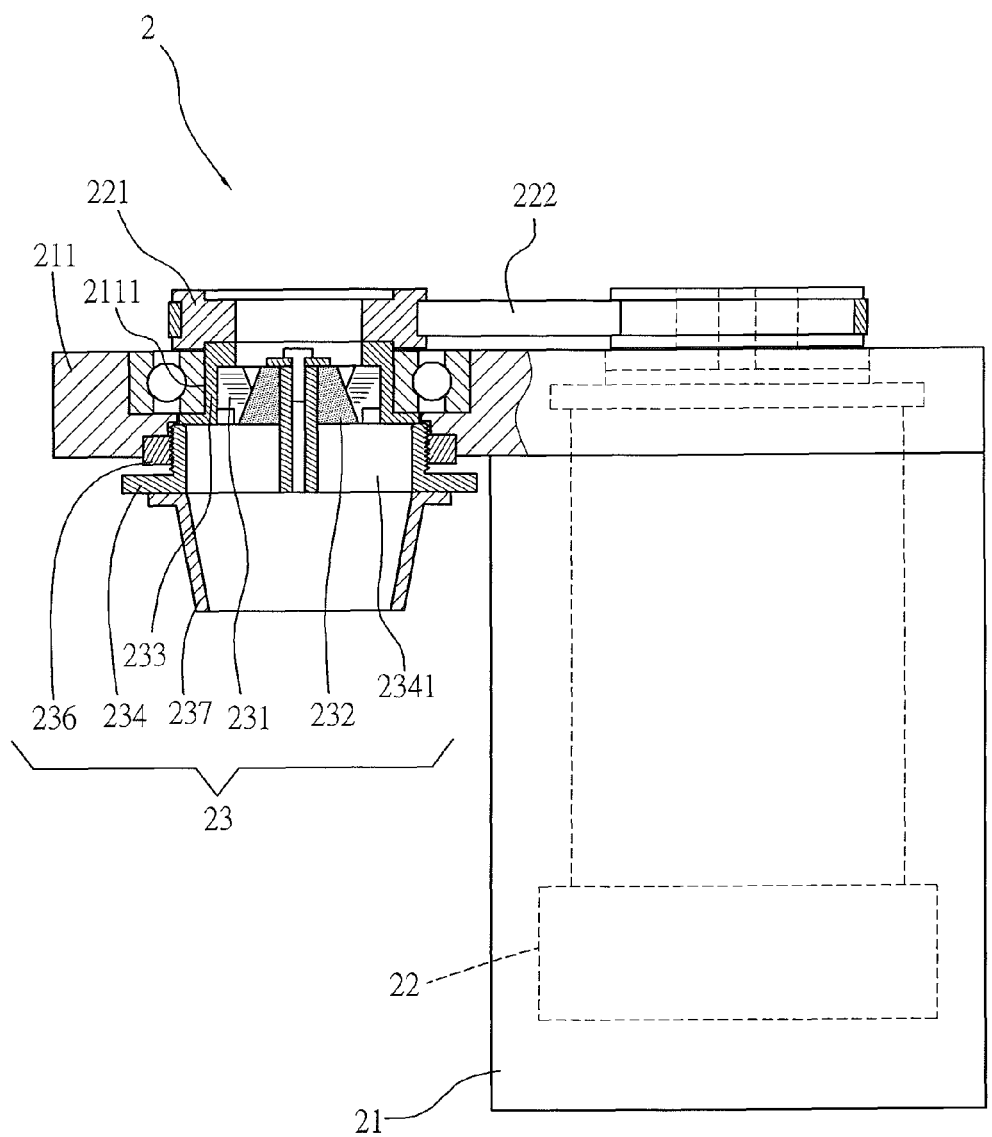
FIG. 4 is a side cross-sectional view of the coffee grinding machine as shown in FIG. 3.
Figure 5:
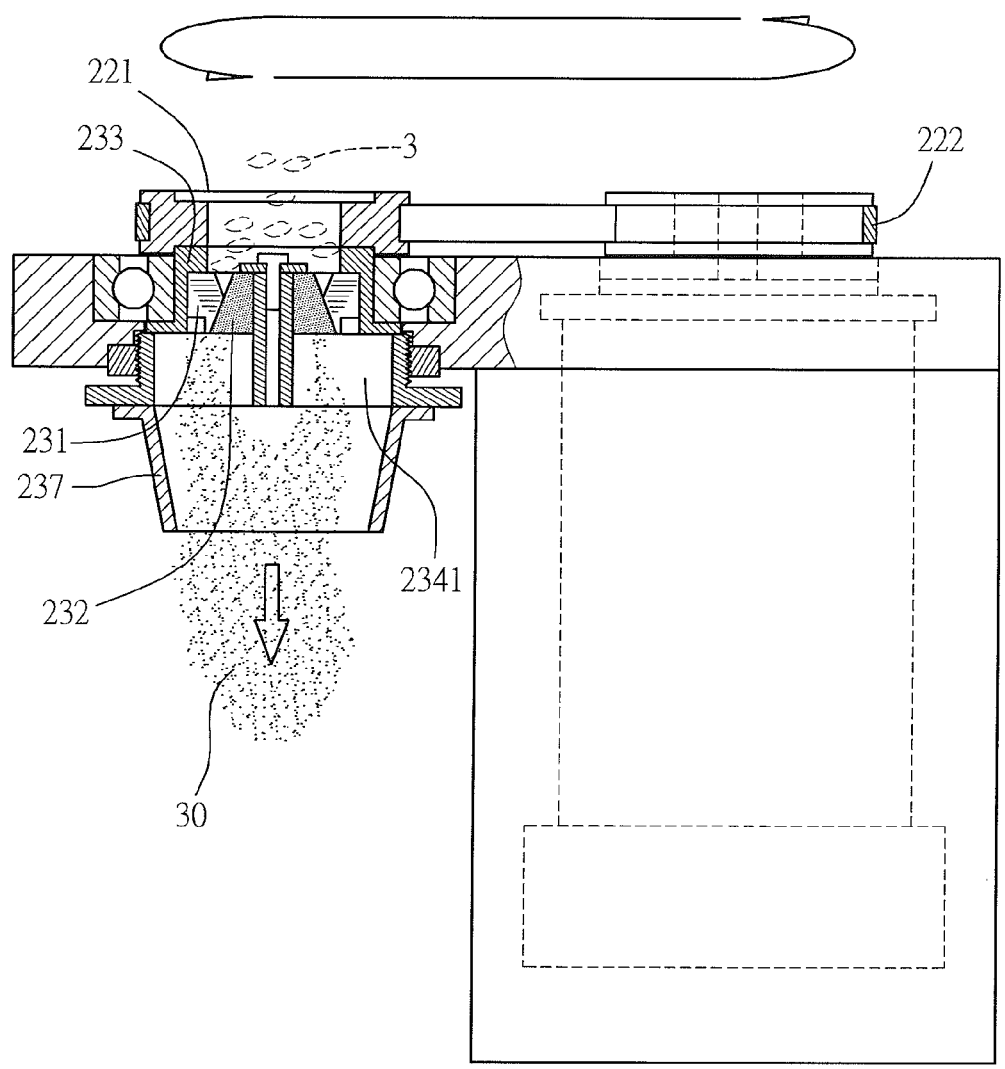
FIG. 5 is a schematic operational view of the coffee grinding machine as shown in FIG. 4 in use.

In operation, referring to FIGS. 4 and 5 with reference to FIGS. 2 and 3, when the motor 22 is started, the belt 222 drives the belt wheel 221 which drives and rotates the bearing 233 so that the balls in the bearing 233 drives the outer cutter 231 to rotate at a high speed. Thus, the outer cutter 231 is rotated about the inner cutter 232 which functions as a center so that the blades of the outer cutter 231 and the inner cutter 232 engage each other. In such a manner, when coffee beans 3 are poured above the belt wheel 221 and the bearing 233 as shown in FIG. 5 and fall into the clearance between the outer cutter 231 and the inner cutter 232, the blade of the outer cutter 231 is rotated at a high speed, while the blade of the outer cutter 231 engage the blade of the inner cutter 232 successively, so that the coffee beans 3 are ground between the outer cutter 231 and the inner cutter 232. Thus, the coffee beans 3 are ground to form coffee powders 30 gradually. At this time, the clearance between the outer cutter 231 and the inner cutter 232 can be adjusted to control the size of the coffee powders 30. The outer cutter 231 is rotated successively during the grinding process so that the coffee beans 3 are ground successively to form the coffee powders 30 gradually, and the coffee powders 30 fall down vertically along the inner cutter 232. Then, the coffee powders 30 pass through the through holes 2341 and fall down into the passage 237. In such a manner, the coffee powders 30 are isolated by the passage 237 so that the coffee powders 30 are gathered to fall down and will not by spread outward.

Accordingly, the outer cutter 231 is rotated to grind the coffee beans 3 so that the coffee powders 30 fall down vertically and will not be blocked on the outer cutter 231 or the inner cutter 232 to prevent the coffee powders 30 from remaining in the outer cutter 231 or the inner cutter 232, thereby facilitating the user clearing the grinding device 23. In addition, the outer cutter 231 is rotated to grind the coffee beans 3 so that the coffee powders 30 fall down completely and will not remain in the grinding device 23 so that the coffee powders 30 will not affect the next grinding procedures, thereby enhancing the coffee quality. Further, when the coffee beans 3 are replaced, it is unnecessary to use fresh coffee beans 3 to push previous coffee beans 3 produced in the last grinding process, thereby saving the coffee beans 3. Further, the coffee powders 30 will not remain in the grinding device 23 so that the user needs not to detach the grinding device 23 for clearing the coffee powders 30.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A coffee grinding machine comprising:
a base, a motor and a grinding device, wherein:
the motor is mounted in the base;
the base has a top face provided with a platform;
the platform is provided with a positioning hole for mounting the grinding device;
the motor is connected with a belt wheel by a belt, a gear or a chain;
the grinding device includes an outer cutter and an inner cutter;
blades of the outer cutter and the inner cutter cooperate with each other;
a bearing is mounted on and located above the outer cutter;
the bearing is connected with the belt wheel;
the belt wheel is rotated to drive the bearing so that the outer cutter is rotated at a high speed;
the inner cutter has a conic shape, and is mounted on a support seat;
the support seat has an interior ring provided with a plurality of through holes;
the inner cutter is mounted in the outer cutter by the support seat; and
the outer cutter is rotated about the inner cutter which functions as a center.

2. The coffee grinding machine of claim 1, wherein a clearance is defined between the outer cutter and the inner cutter and is adjustable to control a size of coffee powder.

* * * * *